UNITED STATES PATENT OFFICE.

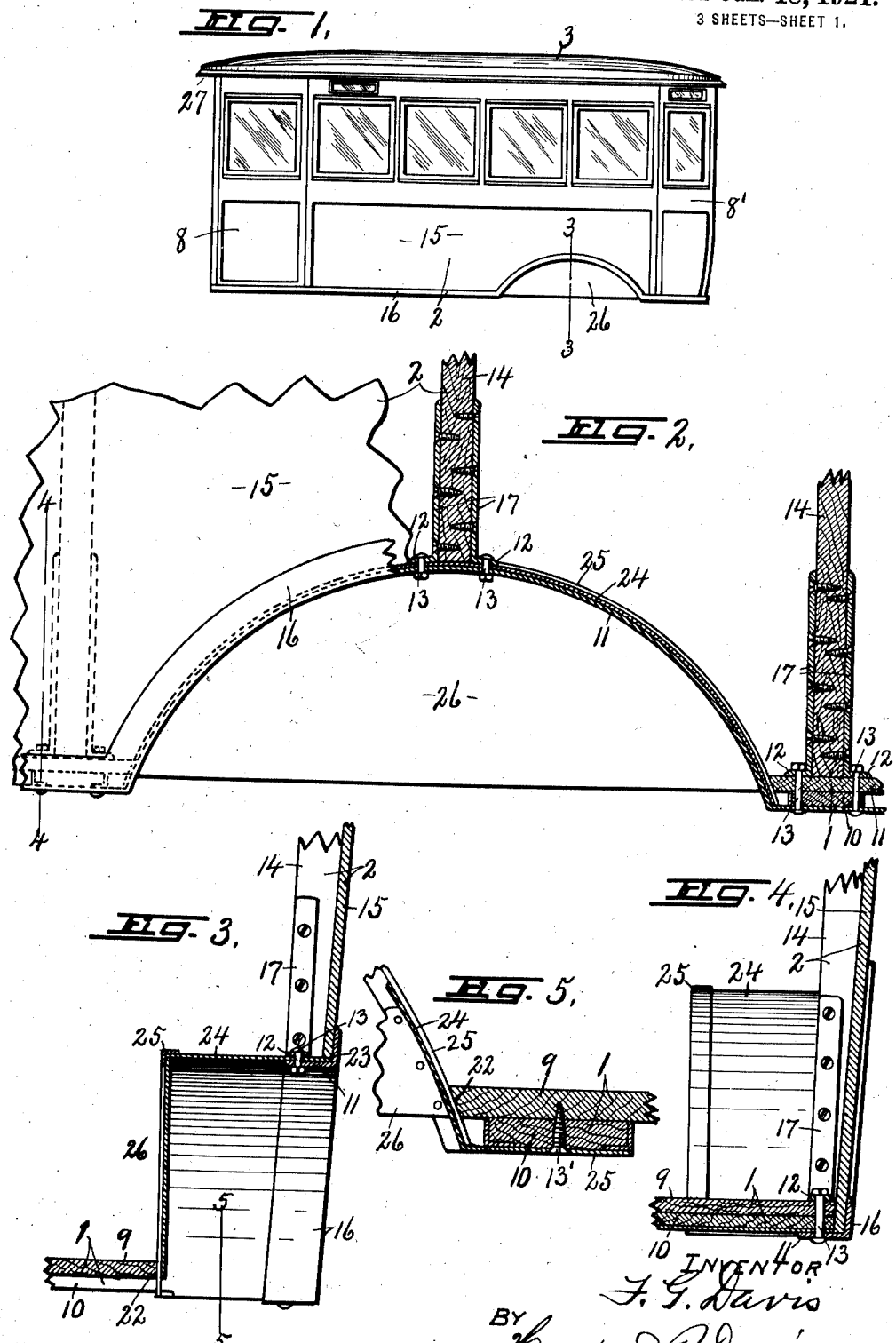

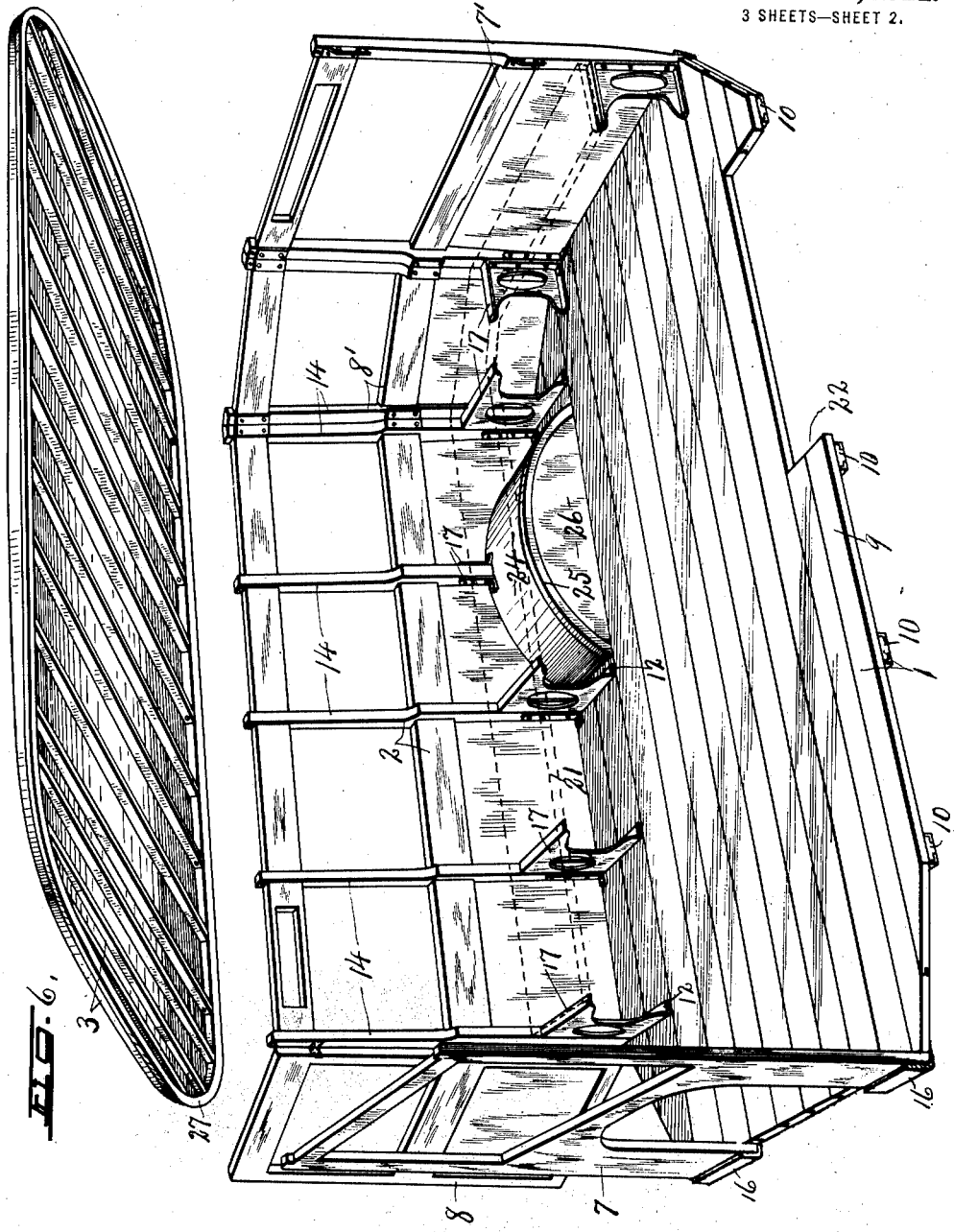

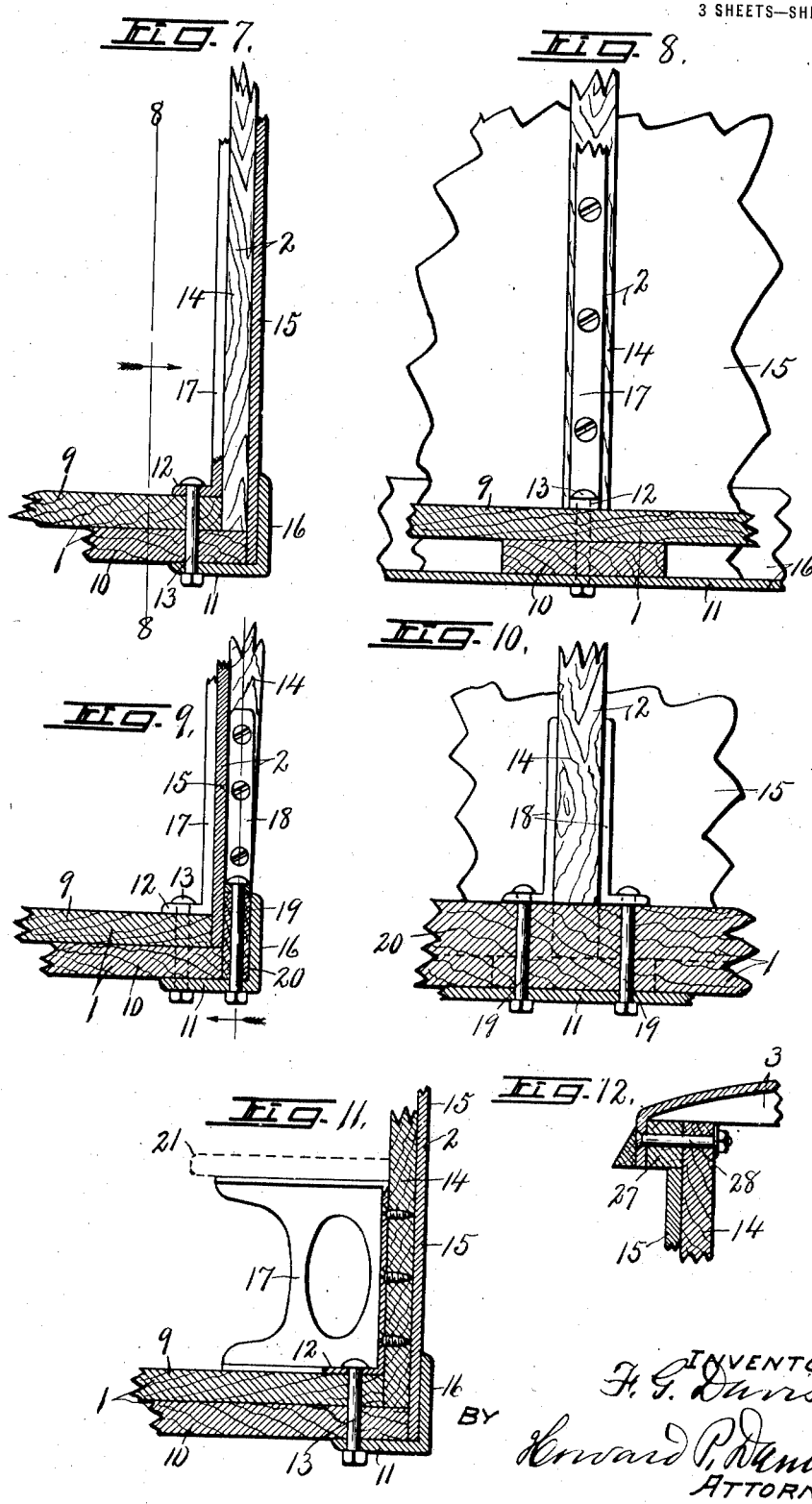

FRANCIS G. DAVIS, OF WATERTOWN, NEW YORK, ASSIGNOR TO H. H. BABCOCK COMPANY, OF WATERTOWN, NEW YORK, A CORPORATION OF NEW YORK.

VEHICLE-BODY.

1,366,168.  Specification of Letters Patent.  Patented Jan. 18, 1921.

Application filed July 5, 1918. Serial No. 243,400.

*To all whom it may concern:*

Be it known that I, FRANCIS G. DAVIS, a citizen of the United States of America, and a resident of Watertown, in the county of Jefferson, in the State of New York, have invented new and useful Improvements in Vehicle-Bodies, of which the following, taken in connection with the accompanying drawings, is a full, clear, and exact description.

This invention relates to certain improvements in vehicle bodies for ambulances, buses and commercial vehicles of the motor driven type involving the use of a bottom section, upright side sections and a top section and suitable means for fastening the adjoining portions of the sections to each other.

The main object is to enable these sections to be made up in quantities as separate units or articles of manufacture, and to provide simple means whereby these sections may be assembled more expeditiously, economically and rigidly than has heretofore been practised, also to permit those sections to be easily and quickly taken apart and placed flatwise one upon the other in compact relation so as to occupy a minimum space in transportation or storage.

One of the specific objects is to assemble each of the side sections and bottom section in such manner that each section will materially stiffen the other section against buckling or sagging and thereby greatly increase the rigidity of the joint by the use of a relatively small number of connecting bolts.

Another object is to permit the use of bodies of substantially the full width of the standard wheel base with the floor or bottom section some distance below the level of the tops of the traction wheels, and to provide said body with suitable wheel housings without in any way weakening the bottom or side sections or reducing the rigidity of the connections between them.

Other objects and uses relating to specific parts of the body will be brought out in the following description.

In the drawings:—

Figure 1 is a side elevation of a bus body embodying certain features of my invention.

Fig. 2 is an enlarged side elevation partly in section of one of the wheel housings and adjoined portions of the body.

Fig. 3 is an enlarged transverse vertical sectional view of the housing taken on lines 3—3 Fig. 1.

Fig. 4 is a similar sectional view taken on line 4—4 Fig. 2.

Fig. 5 is an enlarged detail sectional view taken in the plane line 5—5 Fig. 3.

Fig. 6 is a perspective view of the assembled bottom, one side and end sections of the bus body shown in Fig. 1, the top section being shown as detached.

Fig. 7 is a detail sectional view of portions of the bottom section and one of the side sections of a body in which the posts are secured to the inner faces of the panels.

Fig. 8 is an inner face view partly in section taken on line 8—8 Fig. 7.

Fig. 9 is a sectional view similar to Fig. 7 showing a slightly modified form of side section in which the posts are applied to the outer face of the panels and secured by braces to the sills forming portions of the side sections.

Fig. 10 is a side elevation partly in section, of the parts shown in Fig. 9.

Fig. 11 is a detail sectional view similar to Fig. —7— except that it shows one of the seat supports as forming one of the braces between the side section and bottom section, the seat support being similar to that shown in Fig. 6.

Fig. 12 is a detail sectional view of a portion of the top section and adjacent portion of one of the side sections showing the manner of securing the two sections together.

The body comprises a bottom section —1—, opposite upright side section —2— and a top section —3—, said sections being made up as separate units and assembled in a manner hereinafter described to form the body which as shown in Figs. 1 and 6 may be provided with front and rear end sections —7 and 7'— and opposite pairs of diagonal sections —8 and 8'— between the end sections —7 and 7'— and corresponding ends of the side sections —2.

It is obvious, however, that the end sections —7— and 7' and diagonal sections —8— and 8'— may, in many instances, be dispensed with and the invention is therefore directed more particularly to the combination of the bottom section, side sections and top section, and to the specific means of connecting and bracing those sections at their junctions one to the other, and to the construction of the wheel-housings which enables the bodies to be built the full width of the wheel base of the vehicle.

Each bottom section comprises a flooring 9 of lengthwise matched pieces fastened together at intervals throughout their lengths by cross bars 10, the ends of which project short distances beyond the opposite longitudinal edges of the floor as shown more clearly in Figs. 7 to 11 inclusive, although in Fig. 4 the ends of the cross bars terminate at the corresponding longitudinal edges of the floor.

When the several sections are assembled the lower portions of the side sections 2 abut against the adjacent longitudinal edges of the bottom section and are provided with horizontally projecting flanges 11 and 12 engaging respectively the lower and upper faces of the adjacent portions of the bottom section to which they are fastened by clamping bolts 13 passing through registering apertures in said flanges and bottom section for firmly holding the bottom and side sections in fixed relation and permitting them to be separated by simply removing the bolts.

Each side section preferably consists of a series of upright posts 14 in spaced relation lengthwise of the body and a panel 15 suitably secured to said posts together with suitable metal reinforcing members as an angle iron 16 and braces 17 of which the flanges 11 and 12 are respectively integral parts.

Each angle iron 16 extends the entire length of its side section 2, one of its flanges as 11 extending under the adjoining portion of the bottom section 1 as previously explained while the other flange extends vertically against the outer face of the panel 15 or posts 14 of the corresponding side section and some distance above the upper face of the bottom section for more effectively bracing said section against outward vibration.

The braces —17— when secured to the inner faces of the posts as in Figs. 6, 7, 8, 9 and 11, are preferably arranged in spaced relation lengthwise of the body corresponding to the spacings of the posts —14— to which they are secured directly or indirectly according to the relative positions of the posts and panel of each side section.

As shown in Figs. 1 to 6 inclusive, and 7, 8 and 11 the panels —15— of the side sections are secured to the outer faces of the upright posts —14—, while in Figs. 9 and 10 they are secured to the inner faces of the posts in which latter case the posts are secured by flanged braces —18— and bolts —19— to underlying lengthwise sills —20— forming parts of the corresponding side sections. As shown more clearly in Figs. 2, 3, 4 and 6, the bottom —1— extends under the lower ends of the posts, while the panels which are secured to the outer faces of the posts extend across and abut against the adjacent edges of the bottom, in which case each post is provided with a pair of braces —17— secured to the front and rear faces thereof with their flanges —12— extending lengthwise of the angle iron and secured to the lower horizontal flanges —11— thereof by the bolts —13—, which pass through the bottom —1— in such manner as to cause the upright flange of the angle iron to hold the adjacent portion of the panel or side section —2— firmly against the adjacent edge of the bottom, whereby the angle iron, braces and bolt establish a rigid connection between the sides and bottom and permit said sides and bottom to be readily separated by simply removing the bolts —13—.

If desired the upper ends of the braces —17— on the inner sides of the posts (Figs. 1 and 11) may be returned inwardly over the flanges —12— and connected thereto by a suitable web as shown in Figs. 1 and 11 to form supports for seats as —21— shown by dotted lines in said figures, said braces being then preferably formed from a single piece of relatively light sheet metal so that the bottom, top and side flanges thereof may be integral with the web portion.

In order that the body may be made the full width of the wheel base and still be able to bring the entire bottom section some distance below the top of the wheels it is necessary to provide the body with suitable wheel-housings and to this end the opposite longitudinal edges of the bottom section are provided with transversely alined recesses —22— which in turn are registered with upwardly arched recesses —23— in the adjacent portions of the side sections 2, Fig. 3, the length of the recesses —22— being substantially equal to that of the chords of the arched recesses —23—.

Portions of the angle-irons —16— running along the lower edges of the side sections —2— are also arched upwardly to conform to the arched recesses —23— to receive and support the outer edges of inwardly projecting arched plates —24— which together with flanged braces —17— are secured by bolts —13— to the inwardly projecting flanges —11— of the angle-irons —16—, the side braces —17— being secured to opposite front and rear faces of the posts —14— as shown more clearly in Figs. 2 and 3.

Additional upwardly arched angle-irons —25— are secured at their ends to the under side of the bottom section —1— at opposite ends of the recesses —22— so as to rest against the inner end walls of said recesses to conform to the curvature of the arched recesses —23— Figs. 3 and 5 and to receive and reinforce the inner edges of the arched plates —24— and also the upper edges of upright arched inner plates —26— which form the inner walls of the wheel-housings and are substantially co-extensive with the arched recesses —23—.

The arched members 24, 25 and 26 of the wheel-housings may be permanently secured to the bottom section, in which case the side sections —2— including the flanged members —11 and 12— of the angle-irons —16— and braces —18— may be detached from the bottom section —1— by simply removing the bolts —13—.

In the construction of the body shown from —1 to 6— inclusive, the posts —14— of the side sections 2 are arranged so that —2— of them will be disposed in close proximity to the ends of the wheel-housings while the intermediate posts, which are necessarily shorter than the others, will be disposed directly over the centers of said wheel-housing as shown more clearly at Figs. 2, 3 and 6.

It will also be observed that the seat supporting braces or brackets —17— and wheel-housings rise substantially equal distances from and above the upper faces of the bottom section —1— so that the seats as —21— Figs. 6 and 11 may be practically continuous along the side sections —2—, the transversed width of the brackets and wheel-housings being also substantially equal, and therefore the wheel-housings will be nearly concealed by the seats when the various sections of the body are assembled for use.

The upper ends of these posts —14— extend short distances above the upper edges of the panels —15— for receiving and supporting the top section —3— which is provided with a depending marginal flange —27— fitted closely against the outer faces of the upper end of extensions —14'— of the posts and adapted to be secured thereto by bolts —28— as shown more clearly in Fig. 12, thus permitting the top section to be removed by simply removing the bolts.

The end sections —7 and 7'— and also the diagonally disposed sections —8 and 8'— are also made up as separate units and may be secured to the bottom and top sections in a manner similar to that previously described for the side sections, although it is preferable to hinge one or more of said end or diagonal sections as —8— to one of the adjacent upright sections for the entrance and exit of passengers, in which case the hinged section would be sufficiently shorter than the other sections to permit them to swing over the upper edge of the adjacent portion of the angle-iron —16— and beneath the marginal rail or flange —27— of the top section —3—.

The wheel-housing consisting of the arched plates —24—, 26 and the arched angle iron —25— may also be made up as separate units so that in shipping or storing they may be detached from the sides and bottom sections by removing the bolts —13— and screws as —13'— Fig. 5, the seat supporting brackets being also removed so that the side sections and also the end section, if used, together with the top section may be laid topwise, one upon the other, in compact space, and the wheel-housing and seat supporting brackets similarly arranged in compact space with the remaining sections of the body.

When it is desired to assemble the side sections of the several body side sections the wheel-housings may be secured in place upon the bottom section after which the side sections are secured in place to the bottom section and wheel-housings by the bolts —13— whereupon the top section 3 may be similarly secured to the upper ends of the posts —14— by the bolts —28— whereupon the seat supporting brackets —17— may be placed in operative position ready to receive the seats —21—.

What I claim is:

1. In a vehicle body, the combination of a bottom section having a flooring and cross bars extending under and beyond the outer edges of the flooring, metal reinforcing plates seated against the undersides of the cross bars and projecting outwardly beyond the ends thereof, and opposite upright side sections abutting against the adjacent outer edges of the flooring and cross-bars and resting in part on the outwardly projecting portions of said plates, and devices for rigidly holding the side sections and plates in assembled relation.

2. In a vehicle body, the combination of a bottom section consisting of a floor and cross bars extending under and beyond the outer edges of the floor, metal reinforcing plates seated against the undersides of the cross-bars and projecting outwardly beyond the edges thereof, and opposite upright side sections resting partly on the outer ends of the cross bars and partly on the outwardly projecting portions of said plates, and devices for rigidly holding the bottom section, side sections and plates in assembled relation, said plates having upstanding flanges engaging the outer faces of the side sections.

3. In a vehicle body, the combination of a bottom section consisting of a floor and cross bars extending across the under side of and beyond the floor, opposite side sections each having its lower portion provided with inwardly projecting flanges in vertically spaced relation engaging respectively the lower side of the cross bars and the upper side of the floor and bolted through the floor and cross bars.

4. In a vehicle body, the combination of a bottom section having a floor and underlying cross bars projecting beyond the floor, opposite side sections each having its lower portion provided with inwardly projecting flanges in vertically spaced relation engaging respectively the lower and upper face of the floor and bolted through said floor and cross-bars, portions of the side sections between said flanges abutting against the adjacent faces of the floor and cross-bars.

5. In a vehicle body, the combination of a bottom section, having cross bars projecting beyond the opposite edges of the main portion thereof, plates secured to and projecting beyond the ends of the cross bars, opposite side sections each having a portion thereof abutting against the adjacent edge of the main portion of the bottom and resting on the upper faces of the underlying projections of the cross bars, other portions of the side sections abutting against the adjacent ends of said cross bars, and means for clamping the bottom section and side sections in their assembled relation.

6. In a vehicle body, the combination of a bottom section, having cross bars projecting beyond the opposite edges of the main portion thereof, opposite side sections each having a portion thereof abutting against the adjacent edge of the main portion of the bottom and resting on the upper faces of the underlying projections of the cross bars, other portions of the side sections abutting against the adjacent ends of said cross bars, and metal braces secured to the side sections and adjacent portions of the bottom section.

7. In a vehicle body, the combination of a bottom section, having cross bars projecting beyond the opposite edges of the main portion thereof, opposite side sections each having a portion thereof abutting against the adjacent edge of the main portion of the bottom and resting on the upper faces of the underlying projections of the cross bars, other portions of the side sections abutting against the adjacent ends of said cross bars, and angle plates bolted to the bottom section and engaging the outer side faces of the adjacent portions of the side sections.

8. In a vehicle body, the combination of a bottom section having underlying cross bars, angle irons applied to the underside of opposite ends of said cross bars and having portions thereof projecting upwardly in spaced relation to said ends, opposite side sections having portions thereof interposed between the ends of the cross bars and the adjacent upwardly projecting portions of the angle irons, braces secured to the side sections, and clamping bolts connecting the braces to the portions of the angle irons which underlie the cross bars.

9. In a vehicle body, the combination of a bottom section having wheel openings in the outer edges thereof, opposite upright side sections abutting against the opposite longitudinal edges of the bottom section at the front and at the rear of said openings and provided with inturned flanges engaging respectively the lower and upper faces of the bottom section, and bolted thereto, said side sections being provided with upwardly arched recesses registering with the openings in the opposite edges of the bottom section.

10. In a vehicle body the combination of a bottom section constituting a platform having wheel openings in opposite lengthwise edges thereof, opposite upright side sections having vertically arched recesses registering with said openings, said side sections having their lower edges abutting against the adjacent edges of the bottom section at the front and rear of said openings, angle irons extending along the lower longitudinal edges of the side sections and under the adjacent portions of the bottom sections, said angle irons being arched upwardly along the lower edges of the recesses, and braces secured to the side sections and provided with inturned flanges engaging the upper face of the bottom section and bolted to the underlying portions of the angle irons through the adjacent portions of the bottom section.

11. In a vehicle body, a bottom or platform section having recesses in its opposite lengthwise edges for receiving the wheels of the vehicle, side sections abutting against said edges and provided with upwardly arched recesses registering with the first named recesses, arched angle irons secured to the walls of the second named recesses, arched plates secured to and projecting inwardly from said angle irons, and additional arched angle irons secured to the inner edges of the arched plates and to the bottom or platform section.

12. In a vehicle body, the combination of a bottom section having wheel openings in its opposite longitudinal edges, opposite upright side sections having upwardly arched recesses registering with said openings, said side sections having their lower edges abutting against the adjacent edges of the bottom section at the front and at the rear of said openings and provided with inturned flanges bolted to the bottom and top faces of the bottom section, whereby the side sections may be removed from the bottom section by removing said bolts, and a top section clamped to the upper edges of the side sections.

13. In a vehicle body the combination of a bottom section having wheel openings in the opposite edges thereof, opposite upright side sections having vertically arched recesses registering with said openings and provided with inturned flanges engaging the lower and upper faces of the bottom section at the front and at the rear of said openings, and means for clamping said flanges to the bottom section.

In witness whereof I have hereunto set my hand this 1st day of July, 1918.

FRANCIS G. DAVIS.

Witnesses:
Cora B. Crandall,
Dewey H. Hurd.